United States Patent
Ee et al.

(10) Patent No.: US 9,311,938 B1
(45) Date of Patent: Apr. 12, 2016

(54) DUAL STAGE ACTUATED SUSPENSION HAVING ADHESIVE OVERFLOW CONTROL CHANNELS

(71) Applicant: Magnecomp Corporation, Murrieta, CA (US)

(72) Inventors: Kuen Chee Ee, Chino, CA (US); Peter Hahn, Wildomar, CA (US); Long Zhang, Murrieta, CA (US); Markus Erwin Mangold, Minneapolis, MN (US)

(73) Assignee: MAGNECOMP CORPORATION, Murrieta, CA (US)

( * ) Notice: Subject to any disclaimer, the term of this patent is extended or adjusted under 35 U.S.C. 154(b) by 124 days.

(21) Appl. No.: 14/266,014

(22) Filed: Apr. 30, 2014

Related U.S. Application Data (60) Provisional application No. 61/829,167, filed on May 30, 2013.

(51) Int. Cl.
*G11B 5/48* (2006.01)
(52) U.S. Cl.
CPC .............. *G11B 5/48* (2013.01); *G11B 5/4826* (2013.01); *G11B 5/4853* (2013.01); *G11B 5/486* (2013.01)
(58) Field of Classification Search
None
See application file for complete search history.

(56) References Cited

U.S. PATENT DOCUMENTS

| | | | |
|---|---|---|---|
| 5,409,863 A | 4/1995 | Newman | |
| 5,869,356 A | 2/1999 | Fuller, Jr. et al. | |
| 6,353,515 B1 | 3/2002 | Heim | |
| 6,741,426 B2* | 5/2004 | Girard | 360/245.4 |
| 6,856,075 B1* | 2/2005 | Houk et al. | 310/348 |
| 7,729,089 B1* | 6/2010 | Hogan | G11B 5/4826 360/234.6 |
| 2009/0116150 A1* | 5/2009 | Ohsawa | G11B 5/486 360/245.9 |
| 2011/0279929 A1 | 11/2011 | Kin | |
| 2013/0248233 A1* | 9/2013 | Kanezaki | H05K 1/18 174/260 |

FOREIGN PATENT DOCUMENTS

WO  WO 2009/067111   5/2009

* cited by examiner

*Primary Examiner* — Carlos E Garcia
(74) *Attorney, Agent, or Firm* — Intellectual Property Law Offices of Joel Voelzke, APC

(57) ABSTRACT

A dual stage actuated suspension has microactuators that are adhered to the suspension by adhesive such as epoxy. The epoxy is contained within an adhesive containment vessel defined by walls of an insulating material such as polyimide. Adhesive overflow channels are formed within the polyimide to receive and channel any excess epoxy that overflows over the polyimide wall. The channels may have increasing width to help draw the excess epoxy toward a centrally located reservoir.

20 Claims, 6 Drawing Sheets

DUAL STAGE ACTUATED SUSPENSION HAVING ADHESIVE OVERFLOW CONTROL CHANNELS

CROSS-REFERENCE TO RELATED APPLICATIONS

This application claims priority from U.S. provisional patent application Ser. No. 61/829,167 filed May 30, 2013.

BACKGROUND OF THE INVENTION

1. Field of the Invention

This invention relates to the field of dual stage actuated suspensions for hard disk drives. More particularly, this invention relates to the field a dual stage actuated suspension having channels to control the overflow of adhesive used to affix microactuators to the suspension.

2. Description of Related Art

Figure 1:
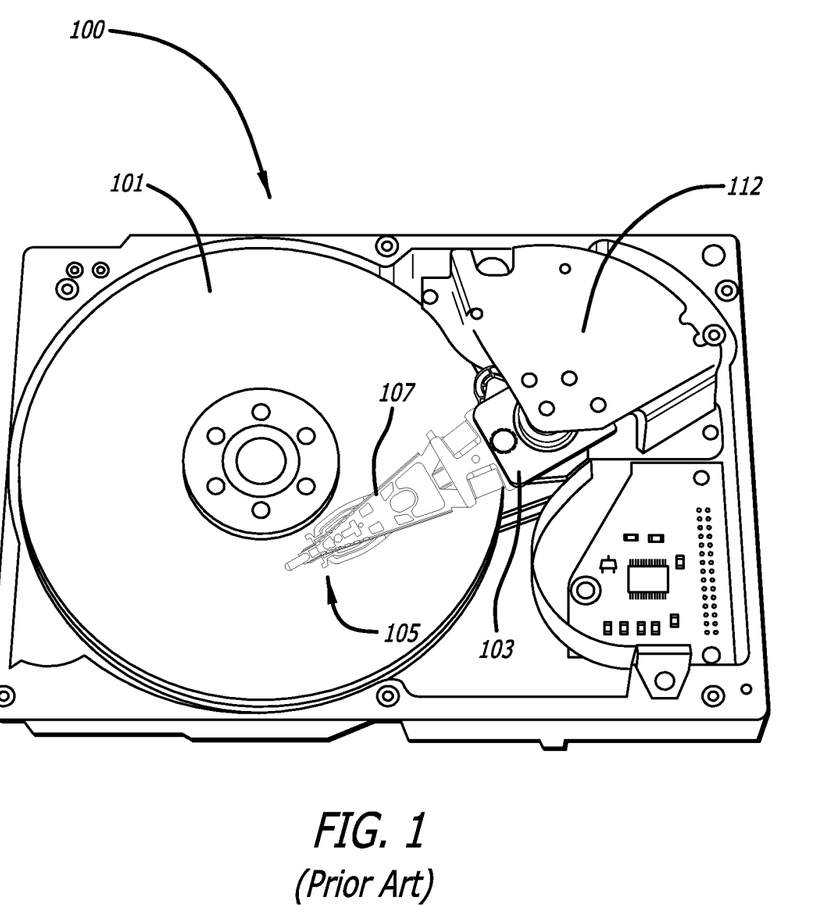
FIG. 1 is an oblique view of a prior art disk driving having a dual stage actuated suspension.

Magnetic hard disk drives and other types of spinning media drives such as optical disk drives are well known. FIG. 1 is an oblique view of an exemplary prior art hard disk drive and suspension for which the present invention is applicable. The prior art disk drive unit 100 includes a spinning magnetic disk 101 containing a pattern of magnetic ones and zeroes on it that constitutes the data stored on the disk drive. The magnetic disk is driven by a drive motor (not shown). Disk drive unit 100 further includes a disk drive suspension 105 to which a magnetic head slider (not shown) is mounted proximate a distal end of load beam 107. The "proximal" end of a suspension or load beam is the end that is supported, i.e., the end nearest to base plate 12 which is swaged or otherwise mounted to an actuator arm. The "distal" end of a suspension or load beam is the end that is opposite the proximal end, i.e., the "distal" end is the cantilevered end.

Suspension 105 is coupled to an actuator arm 103, which in turn is coupled to a voice coil motor 112 that moves the suspension 105 arcuately in order to position the head slider over the correct data track on data disk 101. The head slider is carried on a gimbal which allows the slider to pitch and roll so that it follows the proper data track on the disk, allowing for such variations as vibrations of the disk, inertial events such as bumping, and irregularities in the disk's surface.

Both single stage actuated disk drive suspensions and dual stage actuated (DSA) suspension are known. In a single stage actuated suspension, only voice coil motor 112 moves suspension 105.

In a DSA suspension, as for example in U.S. Pat. No. 7,459,835 issued to Mei et al. as well as many others, in addition to voice coil motor 112 which moves the entire suspension, at least one microactuator is located on the suspension in order to effect fine movements of the magnetic head slider to keep it properly aligned over the data track on the spinning disk. The microactuator(s) provide much finer control and much higher bandwidth of the servo control loop than does the voice coil motor alone, which effects relatively coarse movements of the suspension and hence the magnetic head slider. A piezoelectric element, sometimes referred to simply as a PZT, is often used as the microactuator motor, although other types of microactuator motors are possible.

Figure 2:
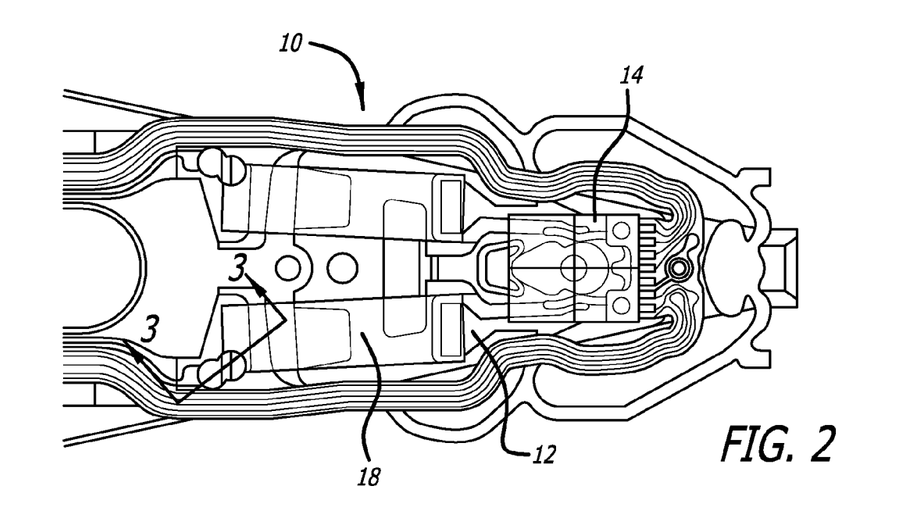
FIG. 2 is a top plan view of the distal end of a dual stage actuated suspension according to a previous design by the assignee of the present application.

FIG. 2 is a top plan view of the distal end of a suspension in which the PZTs are mounted at the gimbal end of the suspension, according to a previous design by the assignee of the present application. No representation or admission is made herein that that design is "prior art" to the present application within the legal meaning of that term. In the design, a microactuator 18 such as a PZT microactuator is bonded at its proximal side to a relatively fixed portion of the suspension including the flexure, and is bonded at its distal side to stainless steel finger 12 that extends from the gimbal on which magnetic read/write head 14 is mounted. As PZT 18 expands and contracts, that expansion/contraction pivots the suspension gimbal from side to side thus effecting fine lateral movements of a transducer head 14, which is usually a read/write head. The lateral movements of transducer head 14 constitute radial movements of transducer head 14 relative to the spinning data disk platter 101.

Figure 3:
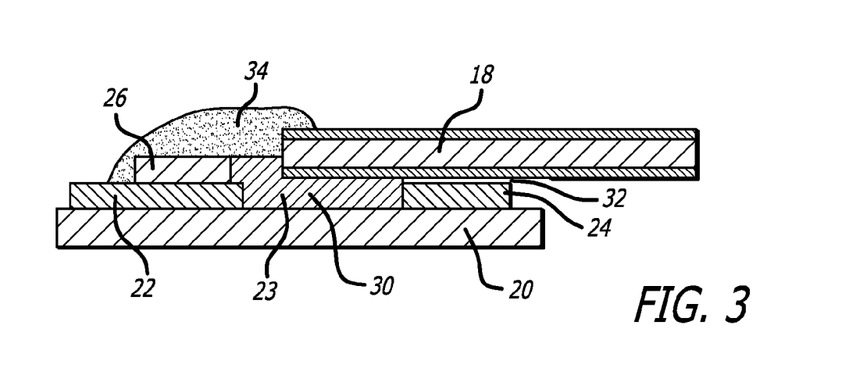
FIG. 3 is a cross section view of the suspension of FIG. 2, taken along section line 3-3.

FIG. 3 is a cross section view of the suspension of FIG. 2, taken along section line 3-3 and showing the details of how PZT 18 is mounted at its proximal end to the relatively fixed part of the suspension, and more specifically to a relatively fixed part of the flexure. The flexure includes a support layer 20 such as stainless steel, an insulating material 22/24 such as polyimide, and a signal conductor such as copper or copper alloy 26. A void or gap 23 is formed in the polyimide 22/24, to create what is effectively a containment vessel into which a non-conductive adhesive such as non-conductive epoxy 30 is dispensed, the non-conductive epoxy 30 being contained by first polyimide section 22 on one side, second polyimide section 24 on a second side, and stainless steel support layer 20 on the bottom. Conductive epoxy 34 is dispensed so as to form a conductive bridge from copper contact pad 26 which is part of the signal conductor layer to the top surface of PZT 18 which is metallized to constitute an electrode. Second polyimide section 24 thus forms not only one side of an epoxy containment vessel, but also acts as an insulation layer that prevents the bottom surface of PZT 18 from electrically shorting to stainless steel 20.

Although it is contemplated that copper contact pad 26 will normally provide the driving voltage for PZT 18 on its top surface, and a ground potential lead (not shown) will normally be electrically connected to the bottom surface of the PZT, it is not necessary that the drive voltage is on top and the ground is on bottom. Those positions could be reversed, with copper contact pad 26 providing the ground potential to the top surface of PZT 18 and the driving voltage being connected to the bottom surface of the PZT.

SUMMARY OF THE INVENTION

The inventors of the present application have discovered that sometimes non-conductive epoxy 30 can intrude undesirably across second polyimide section 24 toward the right hand side of the figure. Enough epoxy 30 must be dispensed in order to fill in gap 23, both because epoxy 30 performs the structural function of bonding PZT 18 to the suspension, and because epoxy 30 serves as an electrical insulator to prevent the bottom surface of PZT 18 from making electrical contact with stainless steel 20 and conductive epoxy 34 which would short out PZT 18. Epoxy 30 can be drawn into the region above polyimide 24 by a combination of the wicking effect between the surfaces of polyimide 24 and the bottom surface of PZT 18, too much epoxy 30 being dispensed into gap 23, and/or PZT 18 being pressed down too far into epoxy 30 during assembly.

Figure 4:
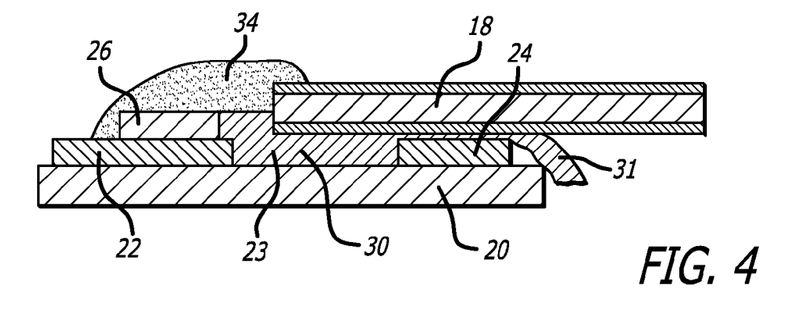
FIG. 4 is the same view as FIG. 3, but also showing overflowing adhesive.

FIG. 4 is the same view as FIG. 3, but also showing overflowing portion 31 of adhesive 30. Overflowing adhesive 31 extends over second polyimide section 24, spilling onto stainless steel 20 and possible even dripping off the suspension.

It is advantageous to control that flow of excess adhesive 31. Adhesive flowing too far and/or unrepeatably can degrade the static attitude attributions of the head suspension assembly, affect the dynamic resonance attributes of it, create variations in the gram load attributes in it, affect the gimbal stiffness, and degrade the stroke length of the microactuator. The inventors of the present application discovered that it can be very difficult to dispense epoxy 30 and assemble the suspension such that flow of epoxy into the region above polyimide 24 is minimized and repeatably controlled.

In order to address these problems, according to the invention second insulating section 24 is provided with one or more adhesive control features in the form of an adhesive overflow channel to contain and/or channel excess epoxy toward a more benign area of the suspension for that excess epoxy to be.

In one aspect therefore, the invention is of a dual stage actuated suspension having one or more adhesive control channels to control and/or contain flow of excess epoxy used to adhere the microactuator(s) to the suspension. The suspension has a base portion comprising a metal support layer, an insulation layer comprising an insulating material on the metal support layer, and a signal conductor layer on the insulation layer. The suspension further has a gimbaled portion on which a transducer head is mounted; a microactuator adhered to the support layer, the microactuator configured to effect fine movements of a transducer head disposed on the gimbaled portion; an adhesive containment structure, the adhesive containment structure comprising a first portion of the insulating material and a second portion of the insulating material, the second portion of the insulating material at least partially disposed underneath the microactuator, the first and second portions of insulating material being separated by a gap; and adhesive disposed within the gap, the adhesive adhering the microactuator to the support layer. The suspension further has an adhesive overflow channel formed in the second portion of insulating material, the adhesive overflow channel being configured to hold adhesive that overflows from the adhesive containment structure over a top surface of the second portion of insulating material during a process of adhering the microactuator to the support layer via the adhesive. The adhesive control channel may extend from underneath the microactuator to an area that is lateral to the microactuator on one or both lateral sides thereof. The channel may become wider in a direction in which it is desired to direct the flow of excess adhesive, including toward a longitudinal axis of the suspension, and may extend to a reservoir that is located on the longitudinal axis of the suspension. The central reservoir may be connected to both a first adhesive control channel that extends underneath a first microactuator, and to a second adhesive control channel that extends underneath a second microactuator, such that any excess epoxy from the bonding of either of two microactuators is channeled to the central reservoir.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 5:
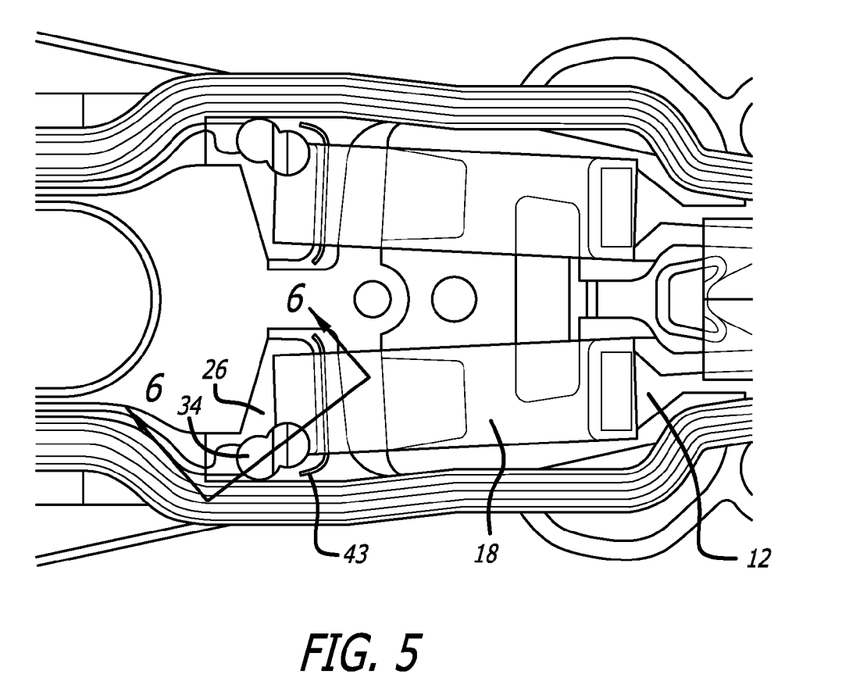
FIG. 5 is a top plan view of the distal end of a dual stage actuated suspension according to one embodiment of the present invention.
Figure 6:
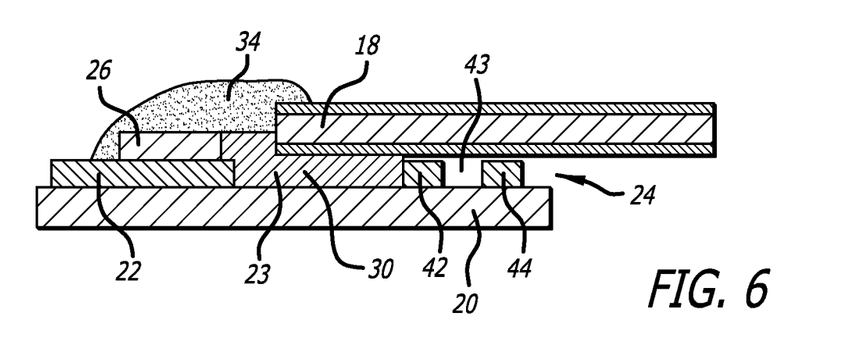
FIG. 6 is a cross section view of the suspension of FIG. 5, taken along section line 6-6.

FIG. 5 is a top plan view of the distal end of a dual stage actuated suspension according to one embodiment of the present invention, and FIG. 6 is a cross section view thereof taken along section line 5-5. According to one embodiment second polyimide section 24 is provided with a recess that defines an adhesive overflow channel into which excess epoxy can flow. Void 43 is defined between first polyimide wall 42 and second polyimide wall 44 that defines second polyimide section 24. Polyimide walls 42 and 44 rise up from support layer 20 but do not rise all the way up to microactuator 18, and extend generally transversely to the suspension. In this embodiment, adhesive overflow channel 43 takes the form of a slit, the slit extending in a generally transverse direction relative to the length of the suspension, the slit also curving at its ends in general conformance to the shape of gap 23, the slit being of approximately uniform width through its length. Epoxy 30 defines a first mass of adhesive that adheres a first end of microactuator 18 to support layer 20. Epoxy 30 that spills out from void 23 over the top of polyimide wall 42 and into epoxy overflow channel 43 will be captured and channeled transversely therein. Epoxy overflow channel 43 acts as both a channel and an adhesive containment structure or reservoir to transversely direct and thereby longitudinally limit the flow of excess epoxy. Channel 43 extends from underneath the microactuator 18 to an area that is not underneath the microactuator. In this embodiment, channel 43 extends from underneath microactuator 18 to areas on either lateral side of microactuator 18 that are not underneath the microactuator.

In a preferred embodiment, epoxy overflow channel 43 has a width that is less than 10% of the length of microactuator 18, and more preferably less than 5% of the length of the microactuator.

Figure 7:
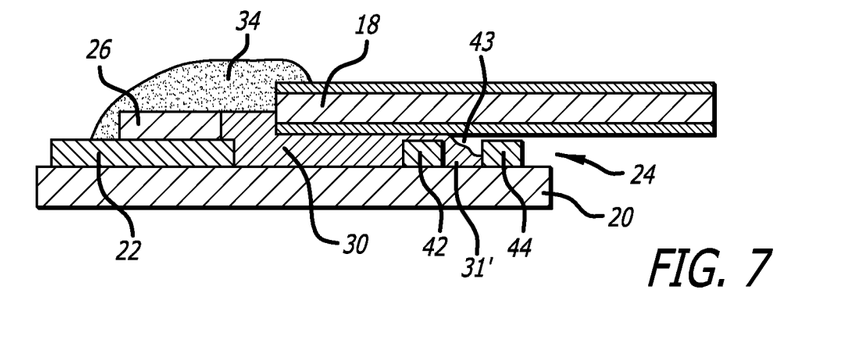
FIG. 7 is the same view as FIG. 6, but also showing overflowing adhesive.

FIG. 7 is the same view as FIG. 6, but also showing overflowing adhesive 31' spilling into the adhesive containment vessel defined by stainless steel substrate 20 on the bottom, and polyimide walls 42 and 44 on either side. The containment vessel contains overflow adhesive 31' and channels it laterally outward from the overflow location. In this context, "laterally outward" means laterally in a direction that is either toward the suspension's central longitudinal axis and/or away from that central longitudinal axis.

Figure 8:
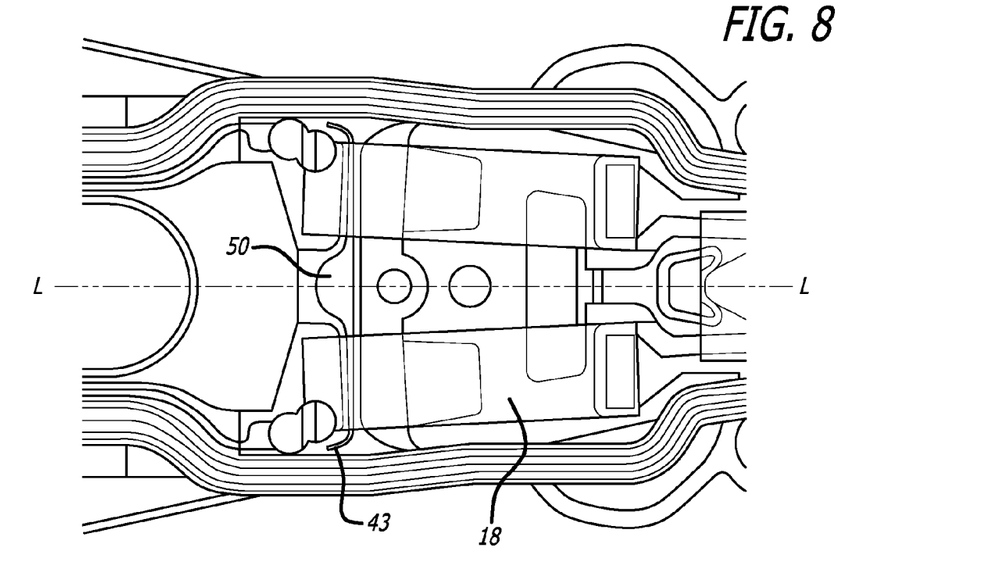
FIG. 8 is a top plan view of a suspension according to a second embodiment of the invention.

FIG. 8 is a top plan view of a suspension according to a second embodiment of the invention. In this embodiment, adhesive overflow channel 43 leads to a reservoir 50 that is wider than the channel and is located closer to the longitudinal axis L-L of the suspension than its associated PZT. Adhesive overflow channel 43 is thus in fluid communication with the reservoir 50. In this embodiment reservoir 50 is a central reservoir that is located on the longitudinal axis L-L of the suspension, and is connected to a first adhesive overflow channel associated with the first PZT and is also connected to a second adhesive overflow channel associated with the second PZT. In this way, excess epoxy from the area of both PZTs will be channeled to central reservoir 50. Because excess epoxy is channeled to a centrally located reservoir, the suspension will be more evenly mass balanced about the longitudinal axis than if the overflow epoxy associated with one of the PZTs all stayed on the lateral side of the suspension from which it originated. Any excess epoxy within reservoir 50 will thus be more benign from a static and dynamic mass balancing perspective, having less of an impact on the suspension's performance.

Figure 9:
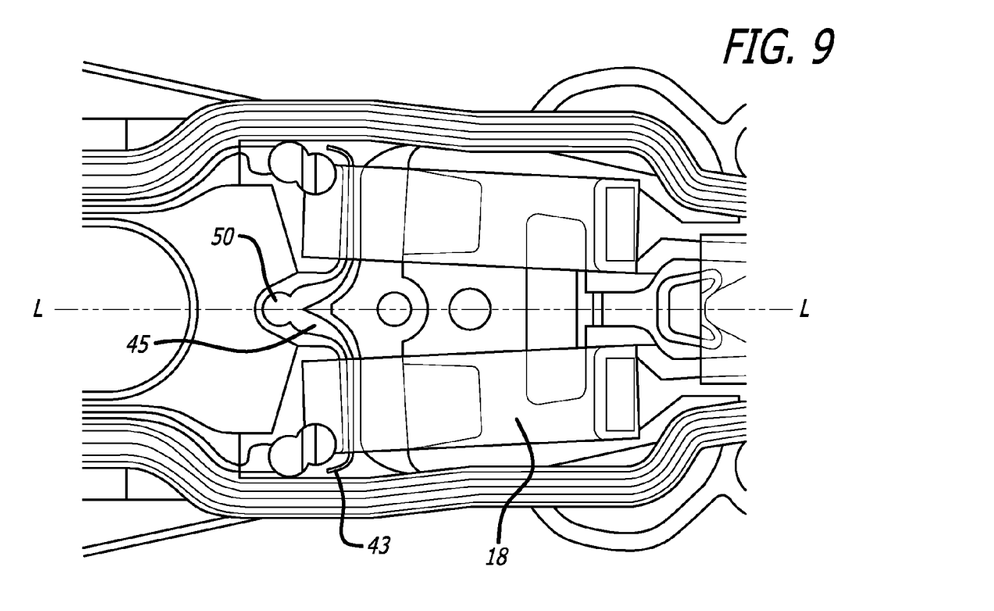
FIG. 9 is a top plan view of a suspension according to a third embodiment of the invention.

FIG. 9 is a top plan view of a suspension according to a third embodiment of the invention. In this embodiment adhesive overflow channels 43 are not of uniform width. Instead, the channels widen in the direction in which it is desired to direct the adhesive overflow, in this case, to a reservoir that is centrally located relative to the longitudinal axis of the suspension, and is located laterally between the two microactuators. The widths of the channels may be smoothly tapered (widening) toward the central longitudinal axis. Selectively widening and narrowing the channel allows the overflow adhesive to be more effectively channeled into a desired area, due to the surface tension of the adhesive which tends to draw the adhesive from the narrower portion(s) of the channel into the wider portion(s) of the channel. The channel geometry including the width of the channel and the angle of the channel walls relative to parallel (i.e., the transition slope of the channel) can be adjusted depending on the viscosity of the adhesive. As with the embodiment of FIG. 8, the central reservoir 50 is wider as the first and second channels 43 at the points that those channels extend underneath microactuators 18. Central reservoir 50 may be at least two, three, or four times as wide as channels 43 at their widest respective points underneath their respectively associated microactuators 18 under which they extend.

Figure 10:
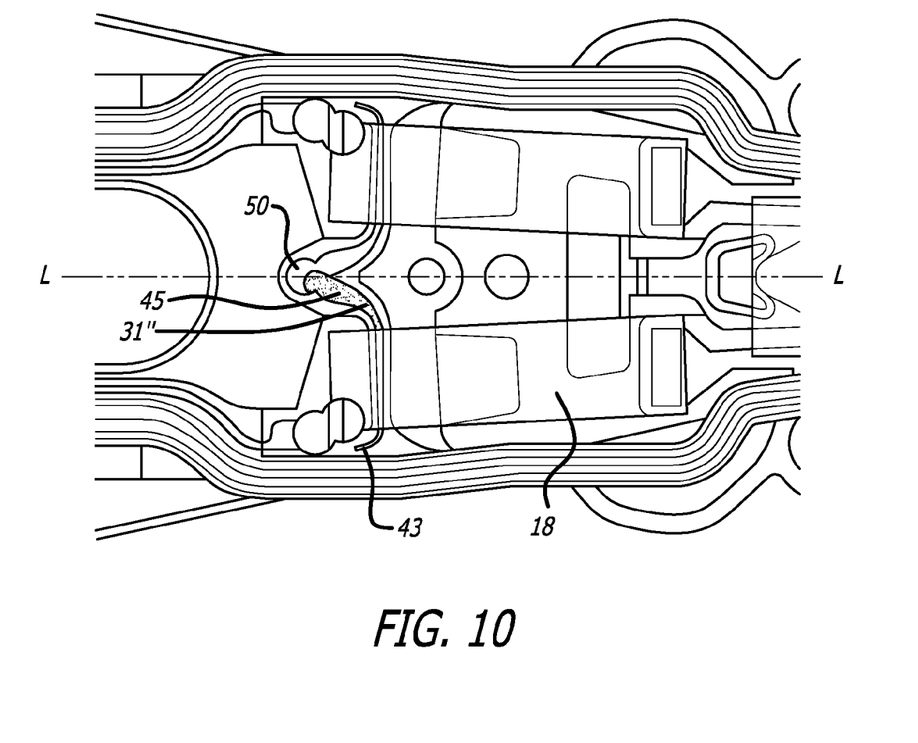
FIG. 10 is the same view as FIG. 9, but also showing overflowing adhesive.

FIG. 10 is the same view as FIG. 9, but also showing overflowing adhesive. Epoxy 30 that overflows from void 23 over the top of polyimide wall 42, thus defining overflow adhesive 31" is caught within epoxy overflow channel 43. Channel 43 will stop at least a significant percentage of the excess epoxy from flowing longitudinally past channel 43, the overflow adhesive 31" instead being directed and channeled laterally, and preferably laterally inwardly toward the central longitudinal axis of the suspension, thus reducing or minimizing the affects from overflowing epoxy as discussed in the Summary of the Invention herein.

It will be understood that the terms "generally," "approximately," "about," and "substantially," and the like as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A dual stage actuated suspension comprising:
    a base portion comprising a metal support layer, an insulation layer comprising an insulating material on the metal support layer, and a signal conductor layer on the insulation layer;
    a gimbaled portion on which a transducer head is mounted;
    a microactuator adhered to the support layer, the microactuator configured to effect fine movements of the transducer head disposed on the gimbaled portion;
    an adhesive containment structure, the adhesive containment structure comprising a first portion of the insulating material and a second portion of the insulating material, the second portion of the insulating material at least partially disposed underneath the microactuator, the first and second portions of insulating material being separated by a gap;
    adhesive disposed within the gap, the adhesive adhering the microactuator to the support layer;
    an adhesive overflow channel formed in the second portion of insulating material, the adhesive overflow channel being configured to hold adhesive that overflows from the adhesive containment structure over a top surface of the second portion of insulating material during a process of adhering the microactuator to the support layer via the adhesive.

2. The dual stage actuated suspension of claim 1 wherein the adhesive overflow channel extends from underneath the microactuator to an area that is not underneath the microactuator.

3. The dual stage actuated suspension of claim 1 wherein the adhesive overflow channel has a tapered width, the channel becoming wider toward a longitudinal axis of the suspension.

4. The dual stage actuated suspension of claim 1 wherein the adhesive overflow channel extends from underneath the microactuator to a reservoir through which a longitudinal axis of the suspension extends.

5. The dual stage actuated suspension of claim 1 wherein the adhesive overflow channel widens as it extends toward a longitudinal axis of the suspension, and extends to a reservoir through which said longitudinal axis of the suspension extends.

6. The dual stage actuated suspension of claim 1 wherein said adhesive overflow channel extends from a point that lies underneath the microactuator to points on either lateral side of the microactuator.

7. The dual stage actuated suspension of claim 1 wherein overflow adhesive is located within the adhesive containment structure, on a top surface of the second portion of the insulating material, and within the adhesive overflow channel.

8. The dual stage actuated suspension of claim 1 wherein a floor of the adhesive containment structure comprises the support layer.

9. The dual stage actuated suspension of claim 1 further comprising a conductive adhesive extending from a top surface of the microactuator to an electrical contact pad comprising the signal conductor layer.

10. The dual stage actuated suspension of claim 1 wherein the microactuator defines a first microactuator and the adhesive overflow channel defines a first adhesive overflow channel extending from underneath the first microactuator, the suspension further comprising:
a second microactuator;
a second adhesive overflow channel extending from underneath the second microactuator, the second adhesive overflow channel being in fluid communication with the first adhesive overflow channel.

11. The dual stage actuated suspension of claim 10 wherein the first and second adhesive overflow channels meet at an adhesive overflow reservoir that is disposed between the two microactuators.

12. A dual stage actuated suspension comprising:
a base portion comprising a metal support layer, an insulation layer comprising an insulating material on the metal support layer, and a signal conductor layer on the insulation layer;
a gimbaled portion on which a transducer head is mounted;
a microactuator adhered to the support layer by adhesive including a first mass of adhesive adhering a first end of the microactuator to the support layer, the microactuator configured to effect fine movements of the transducer head disposed on the gimbaled portion;
a first insulating wall comprising said insulating material at least partially containing said first mass of adhesive, said first insulating wall rising up from said metal support layer toward the microactuator but not all the way to the microactuator;
a second insulating wall comprising said insulating material rising up from said metal support layer, the first and second insulating walls being separated from each other by a gap such that the gap defines a channel between the first and second insulating walls, the first and second insulating walls and the channel being configured such that an overflowing portion of said first mass of adhesive that flows over the first insulating wall during assembly of the suspension is contained by the channel.

13. The dual stage actuated suspension of claim 12 wherein the first and second insulating walls extend generally transversely to the suspension.

14. The dual stage actuated suspension of claim 12 wherein said channel has a width that is less than 5% a length of the microactuator.

15. The dual stage actuated suspension of claim 12 wherein said channel extends from underneath the microactuator to points that are not underneath the microactuator on either lateral side thereof.

16. The dual stage actuated suspension of claim 12 wherein said channel is angled such that it smoothly widens along a direction that is toward a longitudinal axis of the suspension.

17. The dual stage actuated suspension of claim 12 wherein said microactuator defines a first microactuator and said channel defines a first channel, and wherein:
said first channel under the first microactuator is in fluid communication with a second channel under a second microactuator.

18. The dual stage actuated suspension of claim 17 wherein said first and second channels are in fluid communication by a central reservoir that is disposed on a central longitudinal axis of the suspension, the central reservoir being at least three times as wide as said first and second channels at their widest respective points underneath their respectively associated microactuators under which they extend.

19. The dual stage actuated suspension of claim 12 wherein said first mass of adhesive has partially flowed over said first insulating wall, and is contained and directed laterally outward by said channel.

20. A dual stage actuated suspension comprising:
a base portion comprising a metal support layer and an insulation layer comprising an insulating material on the metal support layer;
a microactuator; and
adhesive adhering the microactuator to the suspension, the adhesive being at least partly contained by a wall of said insulating material underneath the microactuator;
wherein the insulating material has a laterally extending channel formed therein and underneath the microactuator such that some of the adhesive that overflows the wall at an overflow location is contained and channeled in a direction that is laterally outward from the overflow location.

* * * * *